(12) United States Patent
Wu et al.

(10) Patent No.: US 7,965,771 B2
(45) Date of Patent: Jun. 21, 2011

(54) METHOD AND APPARATUS FOR IMMEDIATE DISPLAY OF MULTICAST IPTV OVER A BANDWIDTH CONSTRAINED NETWORK

(75) Inventors: Fang Wu, Pleasanton, CA (US); Jack C. Cham, San Leandro, CA (US); Michael Pereira, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1375 days.

(21) Appl. No.: 11/364,152

(22) Filed: Feb. 27, 2006

(65) Prior Publication Data

US 2007/0204320 A1 Aug. 30, 2007

(51) Int. Cl.
*H04N 11/02* (2006.01)
(52) U.S. Cl. .................................. 375/240.12
(58) Field of Classification Search ............. 375/240.01, 375/240.12–240.16
See application file for complete search history.

(56) References Cited

U.S. PATENT DOCUMENTS

| | | | |
|---|---|---|---|
| 3,840,862 A | 10/1974 | Ready | |
| 4,291,196 A | 9/1981 | Spaniol et al. | |
| 4,426,682 A | 1/1984 | Riffe et al. | |
| 4,802,085 A | 1/1989 | Levy et al. | |
| 4,811,203 A | 3/1989 | Hamstra | |
| 5,155,824 A | 10/1992 | Edenfield et al. | |
| 5,307,477 A | 4/1994 | Taylor | |
| 5,524,235 A | 6/1996 | Larson et al. | |
| 5,551,001 A | 8/1996 | Cohen et al. | |
| 5,636,354 A | 6/1997 | Lear | |
| 5,734,861 A | 3/1998 | Cohn et al. | |
| 5,828,844 A | 10/1998 | Civanlar | |
| 5,870,763 A | 2/1999 | Lomet | |
| 5,933,195 A * | 8/1999 | Florencio | 375/240.15 |
| 5,933,593 A | 8/1999 | Arun et al. | |

(Continued)

FOREIGN PATENT DOCUMENTS

EP 1608116 12/2005

(Continued)

OTHER PUBLICATIONS

Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.

(Continued)

*Primary Examiner* — Khanh C Tran
(74) *Attorney, Agent, or Firm* — Stolowitz Ford Cowger LLP

(57) ABSTRACT

In a packet based multicast video streaming network, a method for minimizing delay in displaying video on a TV set in response to a viewer changing the channel is disclosed. For each live multicast video stream, one or more reference frames and corresponding compressed frames are temporarily stored in a memory in anticipation of the viewer switching to that particular program. When the viewer changes channels, the previously stored reference and compressed frames are immediately read from the memory and rendered for display on the TV. This eliminates the need to wait for the next available reference frame. In other words, this eliminates a temporary blank TV screen each time the channel is changed. Certain compressed frames are dropped and blank frames can be inserted in order to catch up to and synchronize with the live video broadcast. The particular frames to be dropped and the number of blank frames to be inserted is a function of the bandwidth limitation imposed by the last mile of the network.

27 Claims, 5 Drawing Sheets

U.S. PATENT DOCUMENTS

| | | | |
|---|---|---|---|
| 6,003,116 | A | 12/1999 | Morita et al. |
| 6,119,205 | A | 9/2000 | Wicki et al. |
| 6,278,716 | B1 | 8/2001 | Rubenstein |
| 6,289,054 | B1 | 9/2001 | Rhee |
| 6,567,929 | B1 | 5/2003 | Bhagavath et al. |
| 6,608,841 | B1 | 8/2003 | Koodli |
| 6,766,418 | B1 | 7/2004 | Alexander |
| 6,782,490 | B2 | 8/2004 | Maxemchuk et al. |
| 6,792,047 | B1 | 9/2004 | Bixby |
| 6,804,244 | B1 | 10/2004 | Anandakumar et al. |
| 6,865,157 | B1 | 3/2005 | Scott et al. |
| 6,910,148 | B1 | 6/2005 | Ho et al. |
| 7,114,002 | B1 | 9/2006 | Okumura et al. |
| 7,164,680 | B2 | 1/2007 | Loguinov |
| 7,180,896 | B1 | 2/2007 | Okumura et al. |
| 7,224,702 | B2 | 5/2007 | Lee |
| 7,234,079 | B2 | 6/2007 | Cheng et al. |
| 7,257,664 | B2 | 8/2007 | Zhang |
| 7,263,075 | B2 | 8/2007 | Roh et al. |
| 7,296,205 | B2 | 11/2007 | Curcio et al. |
| 7,324,527 | B1 | 1/2008 | Fraas et al. |
| 7,373,413 | B1 | 5/2008 | Nguyen et al. |
| 7,392,424 | B2 | 6/2008 | Ho et al. |
| 7,532,621 | B2 | 5/2009 | Birman et al. |
| 7,707,303 | B2 | 4/2010 | Albers |
| 2002/0114332 | A1 | 8/2002 | Apostolopoulos et al. |
| 2002/0126711 | A1 | 9/2002 | Robinett et al. |
| 2003/0101408 | A1 | 5/2003 | Martinian et al. |
| 2003/0158899 | A1 | 8/2003 | Hughes |
| 2003/0236903 | A1 | 12/2003 | Piotrowski |
| 2004/0071128 | A1 | 4/2004 | Jang et al. |
| 2004/0078624 | A1 | 4/2004 | Maxemchuk et al. |
| 2004/0100937 | A1 | 5/2004 | Chen |
| 2004/0114576 | A1 | 6/2004 | Itoh et al. |
| 2004/0143672 | A1 | 7/2004 | Padmanabham et al. |
| 2004/0196849 | A1 | 10/2004 | Aksu et al. |
| 2004/0244058 | A1 | 12/2004 | Carlucci et al. |
| 2005/0058131 | A1 | 3/2005 | Samuels et al. |
| 2005/0074007 | A1 | 4/2005 | Samuels et al. |
| 2005/0078698 | A1 | 4/2005 | Araya et al. |
| 2005/0099499 | A1 | 5/2005 | Braunstein |
| 2005/0198367 | A1 | 9/2005 | Ettikan |
| 2005/0207406 | A1 | 9/2005 | Reme |
| 2005/0249231 | A1 | 11/2005 | Khan |
| 2005/0289623 | A1 | 12/2005 | Midani et al. |
| 2006/0075084 | A1 | 4/2006 | Lyon |
| 2006/0075443 | A1 | 4/2006 | Eckert |
| 2006/0083263 | A1 | 4/2006 | Jagadeesan et al. |
| 2006/0085551 | A1 | 4/2006 | Xie et al. |
| 2006/0126667 | A1 | 6/2006 | Smith et al. |
| 2006/0159093 | A1 | 7/2006 | Joo et al. |
| 2006/0187914 | A1 | 8/2006 | Gumaste et al. |
| 2006/0188025 | A1 | 8/2006 | Hannuksela |
| 2006/0242240 | A1 | 10/2006 | Parker et al. |
| 2006/0242669 | A1 | 10/2006 | Wogsberg |
| 2006/0279437 | A1 | 12/2006 | Luby |
| 2007/0008934 | A1 | 1/2007 | Balasubramanian et al. |
| 2007/0044130 | A1 | 2/2007 | Skoog |
| 2007/0070986 | A1 | 3/2007 | Rabenko et al. |
| 2007/0214490 | A1 | 9/2007 | Cheng et al. |
| 2007/0268899 | A1 | 11/2007 | Cankaya |
| 2007/0277219 | A1 | 11/2007 | Toebes et al. |
| 2008/0062990 | A1 | 3/2008 | Oran |
| 2008/0189489 | A1 | 8/2008 | Mitra |
| 2008/0192839 | A1 | 8/2008 | Gahm et al. |
| 2008/0225850 | A1 | 9/2008 | Oran |
| 2008/0253369 | A1 | 10/2008 | Oran |
| 2008/0256409 | A1 | 10/2008 | Oran et al. |
| 2008/0267078 | A1 | 10/2008 | Farinacci |
| 2008/0310435 | A1 | 12/2008 | Cagenius et al. |
| 2009/0034627 | A1 | 2/2009 | Rodriguez |
| 2009/0034633 | A1 | 2/2009 | Rodirguez |
| 2009/0049361 | A1 | 2/2009 | Koren et al. |
| 2009/0055540 | A1 | 2/2009 | Foti et al. |
| 2009/0119722 | A1 | 5/2009 | VerSteeg |
| 2009/0150715 | A1 | 6/2009 | Pickens |
| 2009/0201803 | A1 | 8/2009 | Filsfils |
| 2009/0201805 | A1 | 8/2009 | Begen |
| 2009/0213726 | A1 | 8/2009 | Asati |
| 2010/0005360 | A1 | 1/2010 | Begen |
| 2010/0036962 | A1 | 2/2010 | Gahm |

FOREIGN PATENT DOCUMENTS

| | | |
|---|---|---|
| EP | 2008728919 | 2/2008 |
| EP | 7814245.2 | 5/2009 |
| EP | 2007814246 | 6/2009 |
| EP | 8731381.3 | 11/2009 |
| WO | 9718637 | 5/1997 |
| WO | 00/76113 | 12/2000 |
| WO | 0161909 | 8/2001 |
| WO | 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009099847 | 8/2009 |

OTHER PUBLICATIONS

International Search Report for PCT/US09/032305; Date of mailing Oct. 5, 2009.

Written Opinion of the International Searching Authority for PCT/US09/032305; Date of mailing Oct. 5, 2009.

International Search Report for PCT/US08/55837; Date of mailing Jul. 3, 2008.

Written Opinion of the International Searching Authority for PCT/US08/55837; Date of mailing Jul. 3, 2008.

Written Opinion of the International Searching Authority for PCT/US08/52907; Mailing Date Jul. 7, 2008.

Written Opinion of the International Searching Authority for PCT/US07/76264; Mailing date Jul. 7, 2008.

International Search Report for PCT/US07/76265 ; Mailing date Aug. 20, 2008.

Written Opinion of the International Searching Authority for PCT-US07/76265; Aug. 20, 2008.

Degalahal, et al., Analyzing Soft Errors in Leakage Optimized SRAM Design, Article, Jan. 2003, pp. 1-7, 16th International Conference on VLSI Design.

Zhang, Computing Cache Vulnerablity to Ransietn Errors and It's Implication, Article, Oct. 2005, pp. 1-9, IEEE Computer Society.

Weaver, et al. Reducing the Soft-Error Rate of a High-Performance Microprocessor, Article, 2004, pp. 30-37, IEEE Computer Society.

Li, et al., Soft Error and Energy Consumption Interactions: A Data Cache Perspective, Article, Aug. 9, 2004, pp. 1-6, ISLPED '04.

Stolowitz Ford Cowger LLP, Listing of related cases Mar. 3, 2010.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

U.S. Appl. No. 11/736,463, filed Apr. 17, 2007—Prosecution History.

U.S. Appl. No. 11/735,930, filed Apr. 16, 2007—Prosecution History.

U.S. Appl. No. 11/561,237, filed Nov. 17, 2006—Prosecution History.

USPTO, PCT International Search Report, PCT/US2007/76264; Jul. 7, 2008, 3 pgs.

Rosenberg, J., et al., "Registration of parityfec MME types", RFC 3009, Nov. 2000, 11 pgs.

Luby, M., et al., "Forward Error Correction (FEC) Building Block", RFC 3452, Dec. 2002, 16 pages.

Luby, M., et al., "Compact Forward Error Correction (FEC) Schemes", RFC 3695, Feb. 2004, 14 pages.

Ott, J., et al., "Extended RTP Profile for RTCP-based Feedback (RTP/AVPF)", draft-ietf-avt-rtcp-feedback-11, Aug. 10, 2004, 52 pages.

Watson, M., "Basic Forward Error Correction (FEC) Schemes", draft-ietf-rmt-bb-fec-basic-schemes-revised-02, Mar. 3, 2006, 17 pages.

Chesterfield, J., et al., "RTCP Extensions for Single-Source Multicast Sessions", draft-ietf-avt-rtcpssm-11, Mar. 6, 2006, 67 pages.

Rey, J., et al., "RTP Retransmission Payload Format", RFC 4588, Jul. 2006, 24 pages.

USPTO, PCT International Search Report, PCT/US2008/052907; Jul. 7, 2008, 3 pgs.—Different.

Schulzrinne, H., "RTP: A Transport Protocol for Real-Time Applications", RFC 3550, Jul. 2003, 89 pages.

Pendleton, et al., Session Initiation Package for Voice Quality Reporting Event, Sipping Working Group, 2006, pp. 1-24.

Handley, M. et al., "SIP: Session Initiation Protocol", RFC 2543, Mar. 1999.

T. Friedman, "RTP Control Protocol Extended Reports (RTCP XR)", RFC 3611, Nov. 2003.

Ott, "Extended RTP Profile for RTCP-based Feedback (RTP/AVPF)" draft-ieft-av-rtcp-feedback-01-txt., Nov. 21, 2001.

Approach Inc., "Streaming Media Technical Analysis", Nov. 2000.

Turner, Jonathan S., "WDM Burst Switching" www.isoc.org/inet99/proceedings/4j/4j_3.htm, 1999.

GossamerThreads, "Channel Change Speed", www.gossamer-threads.com/lists/engine?do=post_view_flat;post=13776, Sep. 12, 2003.

Nguyen, Thinh et.al., Protocols for Distributed Video Streaming, IEEE ICIP 2002.

Byers, John W. et al., Accessing Multiple Mirror Sites in Parallel: Using Tornado Codes to Speed Up Downloads, IEEE 1999.

Cisco Systems, Cisco Visual Quality Experience: Product Overview, www.cisco.com/en/US/partner/prod/collateral/video/ps7191/ps7126/product_data_sheet0900aecd8057f446.html, 2009.

Cisco Systems, Converge IP and DWDM Layers in the Core Network, http://www.cisco.com/en/US/prod/collateral/routers/ps5763/prod_white_paper0900aecd80395e03.html, 2007.

Silver Peak Systems, Inc., "Data Center Class WAN Optimization: Latency & Loss Mitigation", www.silver-peak.com/Technology/latency_loss_mitigation.htm., 2010.

P. A. Chou and Z. Miao, "Rate-distortion optimized streaming of packetized media," Microsoft Research Technical Report MSR-TR-2001-35, Feb. 2001.

Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.

Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.

Supplementary European Search Report for EP08731381, Mar. 26, 2010, 7 pages.

Rey et al., "RTP Retransmission Payload Format—RFC 4588", Jul. 1, 2006, 29 pages.

* cited by examiner

METHOD AND APPARATUS FOR IMMEDIATE DISPLAY OF MULTICAST IPTV OVER A BANDWIDTH CONSTRAINED NETWORK

TECHNICAL FIELD

The present invention relates to a method and apparatus for the immediate display of multicast IPTV over a bandwidth constrained network.

BACKGROUND

Internet Protocol (IP) defines a standard by which data is transmitted over networks in the form of packets which are then routed to the intended recipients. In the past, IP data was limited to text, numbers, or simple pictures due to the constraints imposed by relatively slow and unsophisticated networks. However, as networks and routers become faster and more powerful, it has now gotten to the point where service providers are starting to offer real-time voice-over-IP (VOIP telephony) and digital television (IPTV) in addition to their standard IP-based web/Internet services. This "triple play" option of providing VOIP, IPTV, and IP Internet services over a single DSL, fiber optic, or cable line has proven to be quite popular with subscribers. Subscribers can make telephone calls, watch television, and surf the web without having to deal with a number of different companies. Presumably, the triple play option is cheaper for the consumer than if they had to subscribe to each of the services separately. And for service providers, triple play confers an opportunity to capture revenue from all three sources.

Aside from convenience and cost savings, triple play offers subscribers new features. For example, IPTV has several advantages over that of traditional TV. IPTV's point-to-point distribution scheme enables efficient stream control. Subscribers can pause, wind/re-wind, playback, skip, fast-forward, one-click recording, etc., all from the set-top box. In addition, IPTV inherently has the ability for two-way communication. This enables subscribers to select which movie they want to watch at any given time. Video on demand (VOD) is very popular with subscribers and is a growing source of revenue for service providers.

Unfortunately, video content contains a great amount of data. This is problematic because the "last mile" to/from a residence or office is typically bandwidth constrained. In other words, the last mile of twisted pair copper wires, fiber, cable, or wireless connection is physically limited to handling a maximum number of IP packets which may be transmitted over a given amount of time. IPTV can strain the capacity of the last mile, especially if other users are simultaneously surfing the web or making telephone calls or watching TV in another room.

One commonly used approach for minimizing the bandwidth requirements associated with transmitting video entails compressing the video through a video compression scheme, transmitting the smaller compressed video data, and then decompressing the video data before being displayed. A widely adopted video compression standard is set forth by the Moving Pictures Expert Group (MPEG). For instance, the MPEG-2 standard converts a video stream into I, P and B frames. The I frame is an intra-frame which contains all the data required to display the frame. An I frame is followed by a series of P and B frames. The P frame is a predictive frame which contains only the data that has changed from the preceding I frame. P frames rely on I frames to fill in most of its data. The B frame is a bidirectional frame which contains data that have changed from the preceding frame or are different from the data in the very next frame. By converting the frames of the original video stream into much smaller I, P, and B frames, the video stream comprised of I, P and B frames can be transmitted at a fraction of the bandwidth compared to non-compressed video streams. Once received, the I, P, and B frames are then used to reconstruct the original video stream for playback.

There is, however, one drawback to MPEG-2 and equivalent video compression schemes. When a subscriber switches channels, there can be a significant delay incurred in acquiring and displaying the selected new channel on the television screen. If the subscriber happens to switch channels right after an I frame was just transmitted for the new channel, the TV cannot display any video until the next I frame is received. Although a series of P and B frames are received, they are useless because a corresponding previous I frame is needed as a reference. Essentially, the viewer can occasionally experience a momentary blank or black screen right after switching channels. This can be quite disconcerting to viewers who are accustomed to traditional TV whereby switching channels instantaneously brings up the new channel for viewing.

DESCRIPTION OF THE DRAWINGS

The accompanying drawings, which are incorporated in and form a part of this specification, illustrate embodiments discussed below, and, together with the description, serve to explain the principles of the invention.

DETAILED DESCRIPTION

Figure 1:
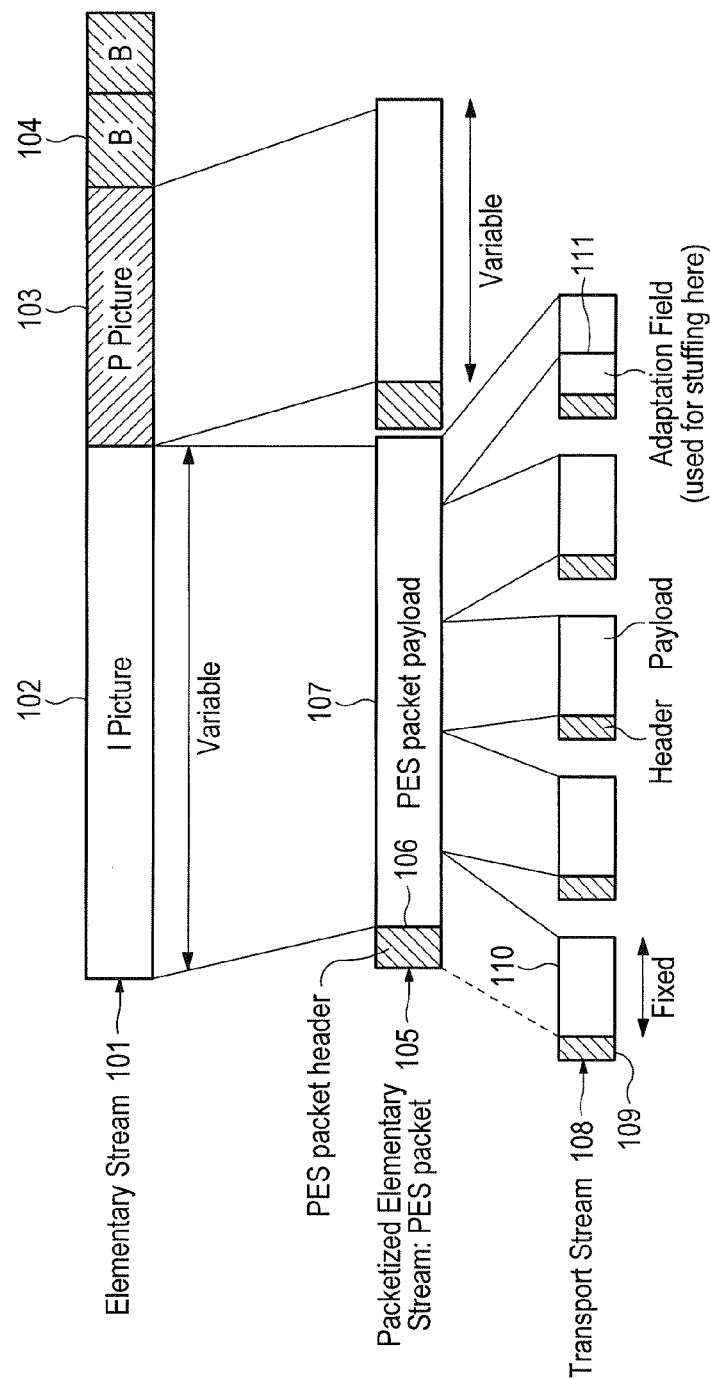
FIG. 1 shows the encoding of frames into PES and TS packets.

A method and apparatus for the immediate display of multicast IPTV over a bandwidth constrained network is described. Embodiments of the present invention significantly reduce the inherent non-deterministic delays associated with channel changing in today's packet based multicast networks where clients tune into different live broadcast channels by selectively joining multicast groups. A significant part of the delay associated with joining a new stream is the time it takes the client to receive program specific information and the initial I frame. In one embodiment, the previous I, P and B frames are temporarily stored in a cache memory. Each multicast broadcast stream has an associated cache memory upon which is stored the previous set of I, P, and B frames for that respective stream. When a viewer changes channels, the client issues a request to join the new multicast broadcast. The previous I frame corresponding to that particular stream is immediately read from the cache memory. This eliminates the need to wait for the next I frame. Because the I frame is readily available from the cache memory, the set-top box can generate a video image for immediate display on the television set. The P and B frames can also be fetched from the cache memory for generating the display of the video. Since the cached frames are burst at a rate higher than the broadcast stream being received, eventually, the live stream will synchronize with the stream being read out from the cache memory. In the case of limited network bandwidth, certain P and B frames can selectively be dropped in order to facilitate the synchronization process within a deterministic amount of time. A general discussion of IPTV and video compression is described below followed by a detailed description of the various embodiments of the present invention.

Today, most carriers are delivering MPEG2 compressed video to subscribers. In general, for MPEG2 and equivalent video compression schemes, the original video and audio are encoded via separate encoders into Elementary Streams (ES). These elementary streams are packetized into PES packets (Packetized Elementary Stream) that have variable packet sizes. These PES packets are then fragmented into 188 byte Transport stream (TS) packets and multiplexed together (VideoTS and AudioTS) before being encapsulated into an IP frame. Typically 7 TS packets would go into an IP frame (either UDP or RTP).

More specifically, MPEG2 encodes video into I, P and B frames or elementary streams. I frames are intra-coded only. An I frame serves as a reference frame for future predictions. Moderate compression (on order of 10:1), limits the propagation of transmission of errors, supports random access and fast forward/fast reverse. P frames are forward prediction from either previous I frames or previous P frames. P frames serve as reference for future P or B frames. P frames give good compression savings (20:1). B Frames are bi-directional interpolated prediction from two sources. B frames serve as previous reference I or P frames (forward prediction) or as future reference I or P frames (backwards prediction). B frames confer the highest compression (50:1).

I Frames=Intra-coded only—reference frame for future predictions.

P Frames=Forward prediction from either previous I frames or previous P frames. Reference for future P or B frames.

B Frames=Bi-directional interpolated prediction from two sources.

Previous reference I or P frames (forward prediction). Future reference I or P frames (backwards prediction).

Referring to FIG. 1, the encoding of frames into PES and TS packets is shown. The Elementary Stream 101 is depicted as I Picture 102, followed by P Picture 103, which is followed by B Picture 104. The Elementary Stream 101 is encoded into a Packetized Elementary Stream (PES packet) 105. The PES packet 105 is comprised of a PES packet Header 106 and a PES packet payload 107. The PES packet 105 is encoded into a Transport Stream 108. The Transport Stream 108 is comprised of packets having a header portion (e.g., header 109) and a fixed payload portion (e.g., payload 110). The last packet shown also includes an Adaptation Field 111 which could occur in any TS packet This format offers great flexibility as to how the delivery of video can be structured. First, the frame rate can be variable; it can start from as low as 10 frames-per-second (fps). The typical frame rate for NTSC is 30 fps, and the typical rate for PAL is 24 fps The number of I frames sent is also variable and since I frames contain the most amount of data, they also incur the heaviest bandwidth requirements. For video with a lot of motion, more I frames should be sent to get the best effect. Also, the higher number of I frames sent, the faster the decoder can start displaying the picture (i.e., faster channel change time from a user perspective), since the decoder needs an I frame to initially sync to; again this has to be weighed against increase in bandwidth to send more I frames.

Figure 2:
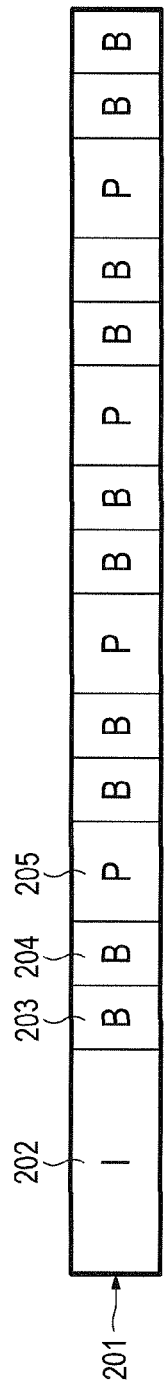
FIG. 2 shows a typical 15 frame Group of Pictures (GOP) that contains I, P and B frames.

A GOP or Group of pictures is defined as the number of I, P, B frames that are sent prior to the next I frame. A typical Group of Pictures (GOP) that contains I, P and B frames sent is shown in FIG. 2. In this particular GOP 201, an I Frame 202 is followed by two B frames 203-204 and a P frame 205. Successive B, B, P, B, B, P, B, B, P, B, and B frames follow. This is commonly referred to as a broadcast channel with a GOP size of 15 (i.e., 15 frames in the GOP). Note that to keep to the frame rate of 30 fps for NTSC, this sequence would have to be repeated twice per second. In a typical GOP sent out, there are 1×I frame, 4×P frames and 10×B frames.

The frame size given the amount of information carried in each is I>>P>>B

Typical bandwidth allocation per frame is I=9, P=2, and B=1. This results in approximately an equal amount of time for transmission of each type of frame:

I frame=1×9=9
P frame=4×2=8
B frame=10×1=10

So in a 30 fps video stream, each frame is allocated 1000/30=33 ms/frame. The bandwidth allocation per type of frame is approx ⅓ the bandwidth which for a 15 GOP results in:

Each I Frame=⅙ bandwidth
Each P frame=1/24 bandwidth
Each B frame=1/60 bandwidth This can be translated into bandwidth requirements per type of frame in a MPEG2 stream.

When the user decides to change channels (i.e., join a different multicast group), he or she has no idea which frame is currently being sourced by the edge device (i.e., I, P or B). The set top box, which includes the decoder, on the other hand, needs an I frame to start to display video from the new channel. It can be seen that with a GOP size of 15 in an NTSC environment, there could be at a minimum 0.5 second variance between best and worst case channel changes and this does not take into account other associated delays.

In one embodiment, the delay is substantially reduced by implementing a Video/Audio Acceleration Mechanism (VAM) that allows clients connected to packet based multicast networks to have fast and deterministic startup delays. Ideally, the VAM should reside at the edge concentrator of the network (e.g., Digital Subscriber Line Access Multiplexer "DSLAM" that support xDSL network, Optical Line Termination "OLT" that support Passive Optical Network or Edge Quadruple Amplitude Modulation card "QAM" that support cable network). However, this VAM function can also reside in the aggregation edge device that sits upstream from the access concentrator. In addition to supporting faster startup delays, the VAM will adaptively adjust the video/audio stream to maintain that the maximum bandwidth that can supported by the last mile access is not violated. This will be described in detail below.

Inherently, client devices have delays associated with various startup mechanisms built in them that vary from set top box vendor to vendor. Delays include local processor reset delays, Phased Lock Loop (PLL) delays etc. Embodiments of the invention addresses the PLL delay and mitigation, but the focus will be on removal of client buffering delay by burst transmission of frames within the bandwidth limitations imposed by the client last-mile loop.

Figure 3:
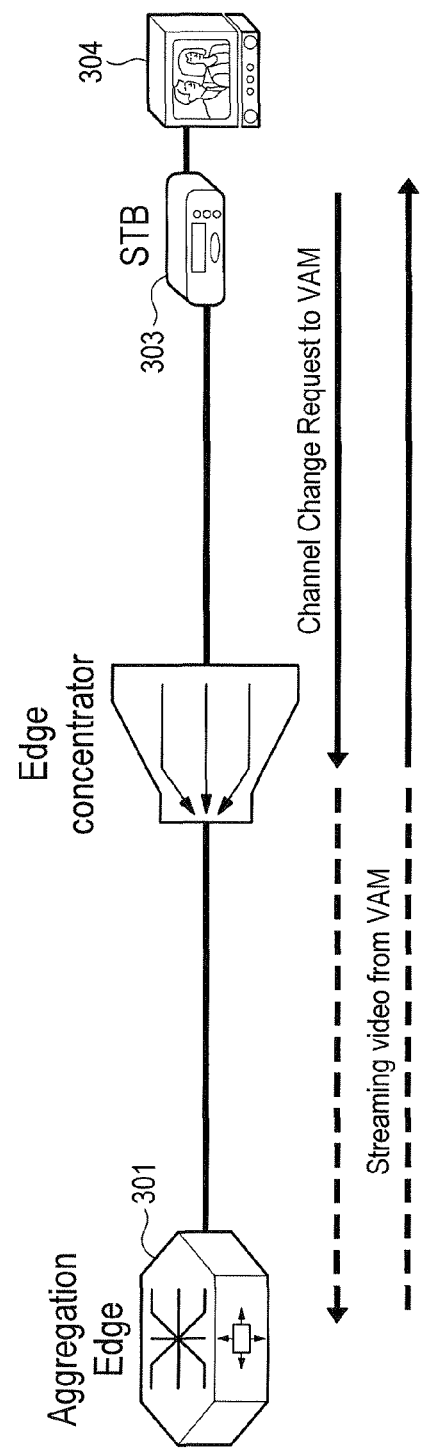
FIG. 3 shows a simplified network topology.

FIG. 3 shows a simplified network topology. The bandwidth constrained last mile exists between the Edge Node 301 and the set top box (STB) 303. Customer requests for channel changes generated by a remote device, propagate thru the STB 303 and to the Video Acceleration Mechanism inside the Edge Node 301. In response to the channel change, the streaming video corresponding to the new channel is transmitted from the VAM, through the last mile to the STB 303 for display on television 304.

Figure 4:
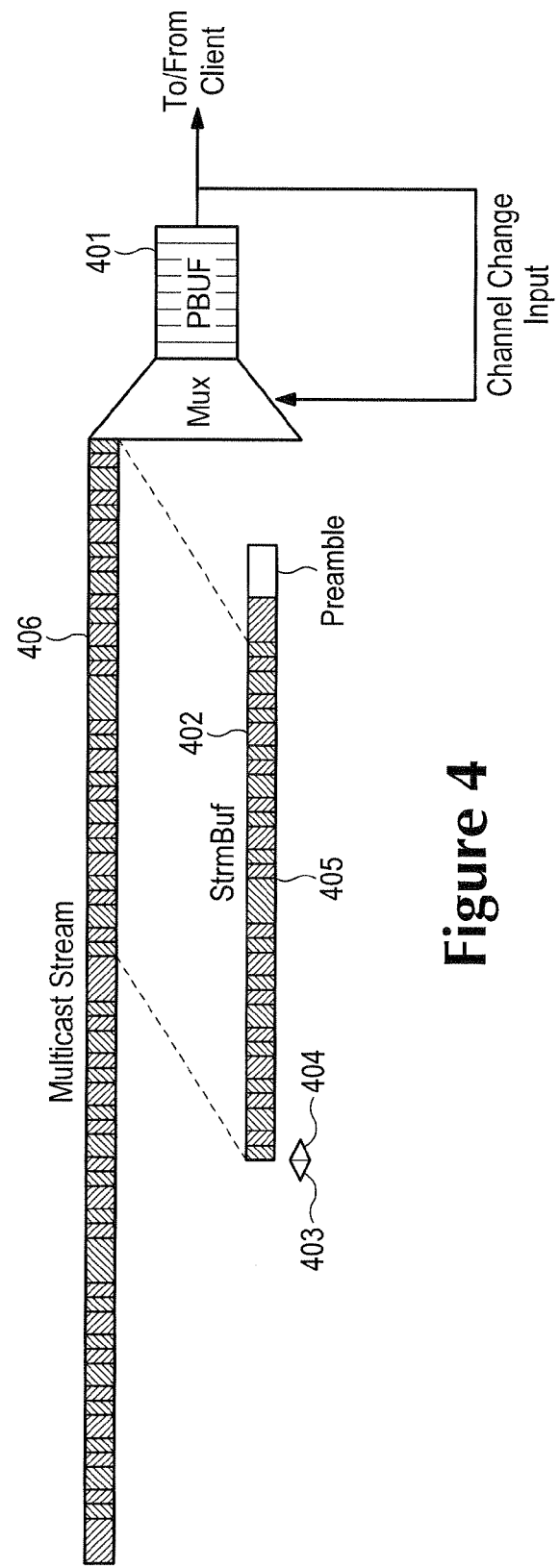
FIG. 4 shows one embodiment for the buffering within a VAM.

FIG. 4 shows one embodiment for the buffering within the VAM. The VAM has separate outgoing client buffers for each client port (PBUF) 401. In addition, the VAM will also have fixed buffers for each multicast stream it is sourcing to clients, referred to herein as Streaming Buffers (StrmBuf). StrmBuf 402 is comprised of a circular buffer with a sliding window of buffers that buffer a fixed number of GOP's aligning the start of the buffer to the start of a GOP as shown in the figure. In addition, a Sync Point (SPT) 403 is defined as part of StrmBuf 402 to indicate a synchronization point between the Video Acceleration component and the regular multicast stream 406. The Sync Point 403 is where StrmBuf 402 merges back to the regular multicast stream 406. After the merge, StrmBuf 402 becomes free and dynamically adjusts to the multicast stream as explained before. Note that the SPT 403 does not necessarily have to be done at an I frame boundary. Also note that while the channel change window (between points 404 and 405) is shown starting at the end of the first GOP with StrmBuf 402 SPT threshold being set for 1 GOP, there will be other more ideal thresholds that will allow the channel change window to move around. Receiving the Channel Change at 405 i.e. just prior to the Next I frame illustrates the case that requires the highest burst bandwidth since the entire prior GOP (15 frames) has to be sent but allows the greatest flexibility in terms of time for the VAM to manage hitting SPT (403). Receiving the Channel Change between 404 and 405 minimizes the burst bandwidth but decreases the flexibility in terms of time for the VAM to manage hitting SPT. To illustrate the Video Acceleration Mechanism functionality the above threshold 405 was chosen.

Figure 5:
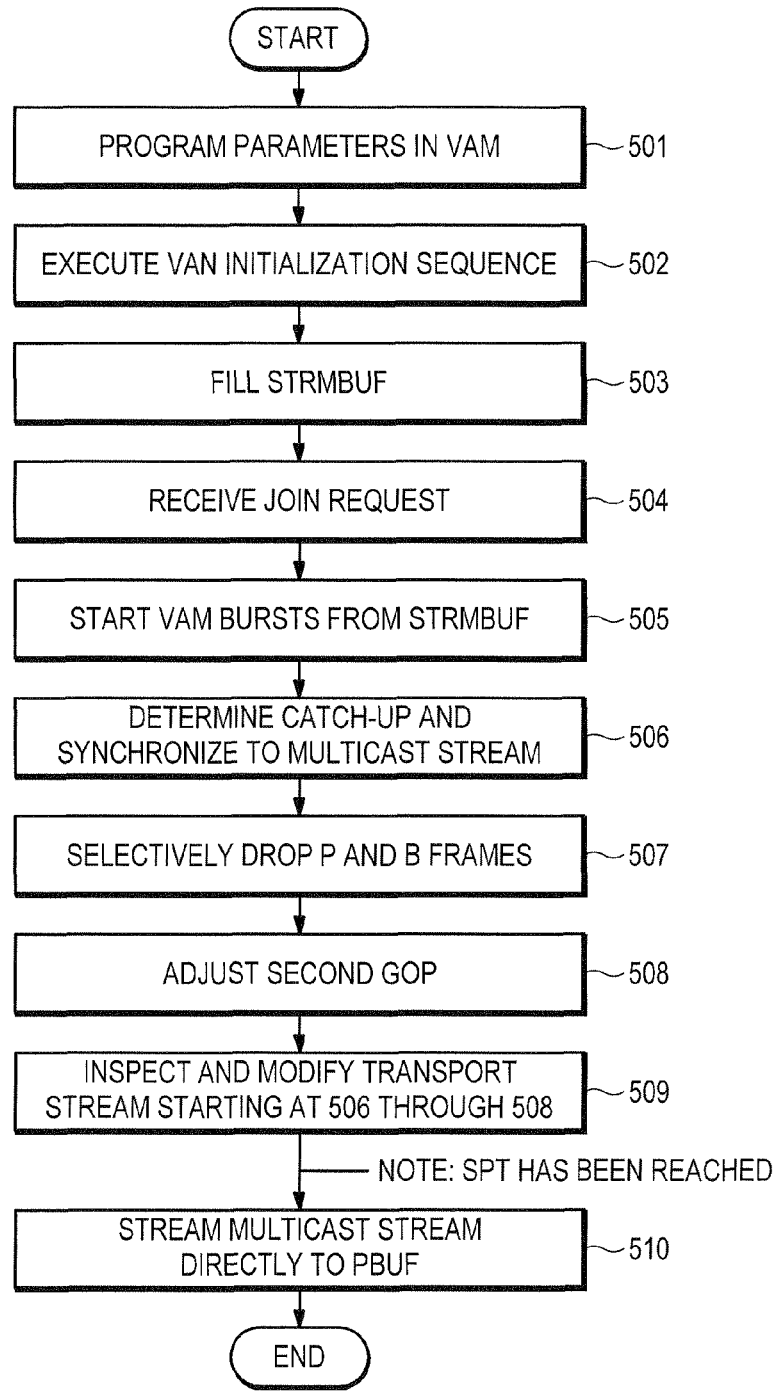
FIG. 5 shows the process flow for one embodiment of the Video Acceleration Module.

FIG. 5 shows the process flow for one embodiment of the Video Acceleration Module. Initially, in process block 501, initialization parameters (e.g., client last-mile bandwidth availability, preamble requirements, etc.) are pre-programmed into the VAM. In process block 502, the VAM builds preamble from incoming multicast stream. Functions that will allow for faster channel change time are configured as part of the initialization sequence and will be captured into preamble space. Bits sent out in PID 0 that detail Program Specific Information (PSI), such as the Program Association Table (PAT) and Program Mapping Table (PMT) as well as a Program Clock Reference that allows the decoder PLL contained in the client device to synch its internal clock to the incoming stream. A typical PCR transmission rate is every 33 ms. In process block 503, the StrmBuf fill begins from a live multicast stream starting with an I frame and a sliding window that includes the preamble as shown in FIG. 4 above. One GOP is always buffered along with the preamble, since the threshold to illustrate the mechanism was chosen to be 1 GOP. The Join Request issued from the client is received by process block 504 at the port by the VAM in the channel change window indicated between points 404 and 405 in FIG. 4 above. In process block 505, the VAM starts bursting from StrmBuf beginning with the preamble and first I frame into the port buffer PBUF. Since StrmBuf has pre-buffering from the incoming multicast stream, for the first GOP, it could be in various stages of being filled anywhere from point 404 to point 405. Point 405 represents the worst case scenario whereby the last B frame has just been received and the VAM has started buffering the start of the I frame into StrmBuf.

In process block 506, the VAM catches up and synchronizes to the multicast stream within the bandwidth constraints imposed by the last mile. The VAM does this by selectively dropping P and B frames as needed to allow for catching up and by selectively adding Blank frames to make sure that the bandwidth for that frame rate does not exceed the maximum specified. As an example, assume that a 4 Mbps MPEG2 stream can be allowed to burst at 33% higher rate during the catch-up window. Looking at the traditional (30 fps) GOP is:

I B B P B B P B B P B B P B B. If one drops every B frame, the result is: I P P P P I P P P P I P P P P. With the bandwidth allocation for each frame given in the overview section, one ends up with a total bandwidth for the case were all B frames were dropped $$= [3(\#I \text{ frames}) * 1/6\text{bw} + 12(\# P \text{ frames}) * 1/24\text{bw}]$$

$$= 1\text{bw} \times 2\text{ GOP/sec}$$

$$= 2\text{bw}$$

which in essence represents that the bandwidth has doubled to send the 15 frame GOP without B frames in 500 ms (30 fps). Now if one selectively adds Blank frames indicated by Bl, one ends up with the following: I P Bl P Bl P Bl P I P Bl P Bl P P. The calculation is now=$2*^1/_6$ bw+$8*^1/_{24}$ bw=$^2/_3$ bw×2GOP/sec which is exactly 30% over the burst period required (i.e., one can safely burst this GOP at 30 fps and meet, and yet not exceed, the stipulated 33% higher bandwidth requirement). The effect of the VAM bursting GOP(s) like this on the viewer is a perception of the channel being fast forwarded for the period the GOP is being sent.

Proceeding to process block 507, the VAM now drops all B frames from the first GOP that it has already pre-buffered and possibly even P frames depending on how much higher bandwidth is allocated for catching-up. This is done based on last-mile bandwidth constraints. Blank frames can and will be added to make sure the burst stream meets bandwidth limits. The higher the bandwidth available to burst, the less frames that need to be dropped and the faster one can reach SPT (i.e., the join point back to the broadcast stream). Next, the VAM, in process block 508, adjusts through the second GOP still being received by selectively dropping B and P frames and inserting Blank frames (for bandwidth reasons) so that it can reach the SPT prior to the next I frame. Taking the example given above, and a worst case channel change at point 405, by the time the burst streaming from StrmBuf reaches Point 405, (1*165 ms) for I frame+(4*41 ms) for P frames+(5×0 ms) for Bl frames=329 ms will have elapsed and 329 ms worth of incoming multicast data will now be contained in the second GOP of StrmBuf. This is equivalent to: I B B P B B P B. The Burst algorithm in VAM can now again selectively drop the B and/or P frames and insert Blank frames as needed to reach the SPT in an iterative process. In the best case where the channel change is received at point 404, the last B frame, all frames except the I's, can be dropped to help catch up the fastest. As a result:

Original StrmBuf=I B B P B B P B B P B B P B B I B B P B B P B B P B B P B B

Burst Stream=I I B

Again, Blank frames will have to be inserted between the I frames to meet maximum bandwidth requirements.

Since the VAM will be adjusting the Transport Stream on the fly, it will have to inspect into the packet and modify the video timestamps and PCR timing contained within the Transport Stream. This is shown by process block 509. Once the SPT has been hit, the mux select changes so that the multicast stream can now be streamed directly to PBUF, as shown by process block 510.

In other embodiments, whereas the choices for which frames to drop may seem quite endless, if one plans on keeping the user experience viewable with an impression of fast forward during the catch-up period, the choices of which frames to drop narrows quickly. For example from the above description of I, P, B frames, it has been realized that not all the P frames in a GOP can be dropped because then the B frames have no reference. Consequently, groups of P and B frames have to be selectively dropped as illustrated below:

Time→

Embodiment 1

I B B P B B P B B P B B P B B I (original frame)
BW=1bw

Embodiment 2

I B B P B B P B B P I B B P B
BW=1.3bw

Embodiment 3

I B B P B B P I B B P B B P I
BW=1.6bw

Embodiment 4

I B B P I B B P I B B P I B B
BW=1.85bw

Embodiment 2 has dropped the last P frame along with the following B frames, since the B frames will have no reference with the P frame removed. Embodiment 3 has dropped the last two P frames along with the associated B frames. Embodiment 4 has dropped the last three P frames with associated B frames. Other embodiments can include selectively dropping any number of B frames in the four embodiments given above. Moreover, Blank frames can be added to the resulting streams to further decrease the BW to meet acceptable maximum thresholds.

As an example for embodiment 4, if the max BW defined is 1.3bw i.e. 30% over the existing stream bandwidth, one needs to insert Blank frames to get from 1.85bw to 1.3bw and hence one needs to modify the GOP to:

I B B B Bl P Bl I B Bl B Bl P Bl I
BW=1.3bw

Note also that embodiment 2 results in the same bandwidth as the example previously given where all the B frames were dropped and Blank frames (Bl) inserted. A static lookup table can be built at initialization time for the Video Acceleration module to access in real time. The table allows the VAM to manage bandwidth requirements against which frames to drop and where to insert Blank frames.

It should be noted that although the subject matter above relating to a method and apparatus for the immediate display of broadcast video delivered over a bandwidth constrained IP network has been disclosed in a language specific to structural features and/or methodological acts, it is to be understood that the subject matter defined in the appended claims is not necessarily limited to the specific features or acts described above. Rather, the specific features and acts described above are disclosed as example forms of implementing the claims.

The features and methodological acts described above can also be applied to other advanced video compression technologies (e.g., advanced video coding—AVC (MPEG4-Part 10), Windows Media (VC1 etc), and all video compression technologies utilizing reference and predictive frames.

The invention claimed is:

1. A method for minimizing delay in displaying video when a channel is changed, comprising:
    storing a most recent reference frame and a plurality of subsequent compressed frames taken from a live broadcast stream being channel-changed in a memory, wherein the reference frame and the plurality of compressed frames were transmitted before the channel was changed;
    reading the reference frame from the memory when the channel is changed;
    transmitting a stream specific preamble and then transmitting the reference frame for display;
    reading selected compressed frames from memory after the channel is changed, wherein the selected compressed frames were chosen based on a bandwidth limitation; and
    transmitting the selected compressed frames for display.

2. The method of claim 1 further comprising:
    transmitting reference frames and a subset of the compressed frames from the memory until synchronization with a live video stream is established.

3. The method of claim 1 further comprising storing reference frames and compressed frames for each of a plurality of packet based multicast video streams.

4. The method of claim 1, wherein the reference frame comprises an intra-coded frame and the compressed frames comprise prediction frames and bi-directional frames.

5. The method of claim 4 further comprising dropping of selected bi-directional frames.

6. The method of claim 5 further comprising selectively dropping of prediction frames.

7. The method of claim 6 further comprising inserting blank frames to meet the bandwidth limitation.

8. The method of claim 5 further comprising inserting blank frames to meet the bandwidth limitation.

9. The method of claim 1 further comprising inserting blank frames to meet the bandwidth limitation.

10. The method of claim 1 further comprising storing information in a pre-configured table, wherein the information include last mile bandwidth, gop size, and stream data rate information.

11. An apparatus for reducing the delay in displaying a video associated with changing a channel in a packet based multicast video broadcast system, comprising:
    a memory for storing a reference frame and a plurality of compressed frames of a video stream corresponding to one channel,
    wherein the memory comprises a circular buffer and the reference frame and the compressed frames of the video stream are stored prior to the channel being changed,
    wherein the circular buffer continuously overwrites older reference and compressed frames with more recent reference and compressed frames of the video stream; and
    a processor coupled to the memory, wherein when the channel is selected, the processor reads the reference frame and selects particular compressed frames of the video stream from the memory based on available bandwidth for transmission to render a video display corresponding to the channel.

12. The apparatus of claim 11 further comprising:
    a plurality of memories coupled to the processor, wherein the plurality of memories store reference frames and compressed frames corresponding to live video streams being broadcast over a plurality of channels.

13. The apparatus of claim 11, wherein the memory and the processor comprise a video/audio acceleration mechanism.

14. The apparatus of claim 11, wherein the memory and the processor reside at an edge concentrator of a network.

15. The apparatus of claim 11, wherein the video frames are compressed by an AVC (advanced video coding) compression technique.

16. The apparatus of claim 11, wherein the video frames are compressed by a VC-1 (Windows media) compression technique.

17. An apparatus for reducing delay in displaying a video associated with changing a channel in a packet based multicast video broadcast system, comprising:
a memory for storing a reference frame and a plurality of compressed frames of a video stream corresponding to one channel, and
a processor coupled to the memory, wherein when the channel is selected, the processor reads the reference frame and selects particular compressed frames of the video stream from the memory based on available bandwidth for transmission to render a video display corresponding to the channel,
wherein the processor drops some of the compressed frames and inserts blank frames in order to catch up to and synchronize with a live video stream.

18. The apparatus of claim 17, wherein the processor selectively drops groups of prediction frames and bi-directional frames.

19. The apparatus of claim 17, wherein when the channel is changed, the reference frame stored in the memory is immediately read and processed for display and selected compressed frames are read from the memory and processed for display such that a video is displayed on a television set with minimal delay and the video appears to be fast forwarded until it synchronizes with a live video stream.

20. The apparatus of claim 17, wherein the memory and the processor reside in an aggregation edge device.

21. The apparatus of claim 17, further comprising memory for storing data including last mile bandwidth, gop size, and stream data rate information.

22. The apparatus of claim 17, wherein the video frames are compressed by a compression technique utilizing reference frames and predictive frames.

23. An apparatus for temporarily storing previous frames of video data in anticipation of a channel change in a packetized video system having a limited bandwidth capacity, comprising:
means for caching the previous frames of video data of a video stream corresponding to a channel;
means for determining which of the frames of video data is to be transmitted based on the limited bandwidth capacity;
means for transmitting pre-determined frames of video data when the channel is selected;
means for providing a faster display of video data.

24. The apparatus of claim 23 further comprising:
means for inserting blank frames in the video stream, wherein a number of blank frames inserted is a function of the limited bandwidth capacity.

25. The apparatus of claim 23 further comprising: means for catching up to and synchronizing with a live video stream.

26. The apparatus of claim 23 further comprising:
means for selectively dropping frames of video data in order to synchronize with a live video broadcast without exceeding the limited bandwidth capacity.

27. The apparatus of claim 23 further comprising means for compressing video.

* * * * *

UNITED STATES PATENT AND TRADEMARK OFFICE
CERTIFICATE OF CORRECTION

| | |
|---|---|
| PATENT NO. | : 7,965,771 B2 |
| APPLICATION NO. | : 11/364152 |
| DATED | : June 21, 2011 |
| INVENTOR(S) | : Fang Wu, Jack C. Cham and Michael Pereira |

It is certified that error appears in the above-identified patent and that said Letters Patent is hereby corrected as shown below:

Title Page 2, Item (56) Column 2 (Other Publications), Line 20, delete "Vulnerability to Ransietn" and insert --Vulnerability to Transient--, therefor.

Title Page 2, Item (56) Column 2 (Other Publications), Line 45, delete "MME" and insert --MIME--, therefor.

Signed and Sealed this
Tenth Day of July, 2012

David J. Kappos
*Director of the United States Patent and Trademark Office*